United States Patent
Zhu et al.

(10) Patent No.: US 11,370,659 B2
(45) Date of Patent: Jun. 28, 2022

(54) POROUS CARBON-BASED METAL CATALYST AS WELL AS PREPARATION METHOD AND APPLICATION THEREOF

(71) Applicant: CQC INTIME TESTING TECHNOLOGY CO., LTD., Suzhou (CN)

(72) Inventors: Yixin Zhu, Suzhou (CN); Jie Wang, Suzhou (CN)

(73) Assignee: CQC INTIME TESTING TECHNOLOGY CO., LTD., Suzhou (CN)

( * ) Notice: Subject to any disclaimer, the term of this patent is extended or adjusted under 35 U.S.C. 154(b) by 0 days.

(21) Appl. No.: 17/426,105

(22) PCT Filed: Jul. 9, 2020

(86) PCT No.: PCT/CN2020/100961
§ 371 (c)(1),
(2) Date: Jul. 28, 2021

(87) PCT Pub. No.: WO2021/258425
PCT Pub. Date: Dec. 30, 2021

(65) Prior Publication Data
US 2022/0098033 A1    Mar. 31, 2022

(30) Foreign Application Priority Data
Jun. 22, 2020   (CN) .................... 202010571043.0

(51) Int. Cl.
| | | |
|---|---|---|
| *C01B 3/06* | (2006.01) | |
| *B01J 21/18* | (2006.01) | |
| *B01J 23/835* | (2006.01) | |
| *B01J 27/24* | (2006.01) | |
| *B01J 35/02* | (2006.01) | |
| *B01J 37/02* | (2006.01) | |
| *B01J 37/06* | (2006.01) | |
| *B01J 37/08* | (2006.01) | |
| *B01J 37/34* | (2006.01) | |
| *B01J 38/08* | (2006.01) | |
| *H01M 4/88* | (2006.01) | |
| *H01M 4/96* | (2006.01) | |

(52) U.S. Cl.
CPC ............... *C01B 3/06* (2013.01); *B01J 21/18* (2013.01); *B01J 23/835* (2013.01); *B01J 27/24* (2013.01); *B01J 35/023* (2013.01); *B01J 37/024* (2013.01); *B01J 37/06* (2013.01); *B01J 37/08* (2013.01); *B01J 37/343* (2013.01); *B01J 38/08* (2013.01); *H01M 4/885* (2013.01); *H01M 4/96* (2013.01); *C01B 2203/0277* (2013.01); *C01B 2203/1052* (2013.01); *C01B 2203/1082* (2013.01)

(58) Field of Classification Search
None
See application file for complete search history.

(56) References Cited

FOREIGN PATENT DOCUMENTS

| CN | 105498823 A | * | 4/2016 | ............. Y02E 60/36 |
|---|---|---|---|---|
| CN | 107159214 A | * | 9/2017 | ............. Y02E 60/36 |

* cited by examiner

*Primary Examiner* — Colin W. Slifka
*Assistant Examiner* — Michael Forrest
(74) *Attorney, Agent, or Firm* — Bayramoglu Law Offices LLC

(57) ABSTRACT

A porous carbon-based metal catalyst, a preparation method and application thereof are provided. The preparation method includes: successively performing activation, surface corrosion, nitrogen-doping treatment and graphitization treatment on washed micro-grade porous carbon, then performing sensitization treatment, and subsequently carrying out loading, reduction and other treatments of catalytic metal, so as to finally obtain the porous carbon-based metal catalyst. The porous carbon-based metal catalyst provided by the present application has excellent catalytic performance, is especially suitable for producing hydrogen by efficiently catalytically decomposing ammonia borane, is not prone to inactivation, and is easy to regenerate after inactivation. Meanwhile, the preparation method is environmental-friendly, is suitable for large-scale production and has a wide application prospect in the fields such as hydrogen fuel batteries.

12 Claims, No Drawings

US 11,370,659 B2

POROUS CARBON-BASED METAL CATALYST AS WELL AS PREPARATION METHOD AND APPLICATION THEREOF

CROSS REFERENCE TO THE RELATED APPLICATIONS

This application is the national phase entry of International Application PCT/CN2020/100961, filed on Jul. 9, 2020, which is based upon and claims priority to Chinese Patent Application No. 202010571043.0, filed on Jun. 22, 2020, the entire contents of which are incorporated herein by reference.

TECHNICAL FIELD

The present application relates to the technical field of composites, particularly to a porous carbon-based metal catalyst as well as a preparation method and application thereof.

BACKGROUND

As the economy is rapidly developed and populations are continuously increased, the demand of energy is increasingly expanded. Although there is a large proportion of fossil fuel in an energy structure, the fossil fuel is a non-renewable resource and brings certain pollutions to environments, and the resulting energy risk problem is increasingly prominent. To solve this problem, it is crucial to develop novel renewable low-carbon green energy and its efficient and clean storage conversion technology. Hydrogen energy, as a secondary energy which is rich in storage amount, high in energy density, convenient to use and wide in application, has received wide attraction from science researchers at home and abroad.

At present, activated carbon is the most important commercial electrode material, which is widely applied to frontier technology fields such as super capacitors, lithium ion batteries, gas adsorption and separation and water purification due to a large amount of pore structure, large specific surface, strong adsorption capacity, stable physical and chemical performance, cheap price and other advantages. At present, there are many porous carbon material synthesis methods, mainly including two types: a template method and an activation method. The carbon material prepared by the traditional template method is single in pore size and low in micropore content, and has the disadvantages of complicated operation, long preparation time, no guarantee of the purity of the carbon material and the like. Therefore, the activation method becomes one of research hot spots for preparing a carbon material having a porous structure and a high specific surface area. For example, some researchers utilize coordination polymers to react with nickel ions and other ions to prepare a precursor, hydrothermally allow the precursor to react with palladium salt or the like so as to obtain a palladium nano particle-supported catalyst, the catalyst has a catalytic activity to be improved and is easy to inactivate.

SUMMARY

The present application aims to provide a porous carbon-based metal catalyst as well as a preparation method and application thereof to overcome the defects of the prior art.

In order to achieve the above object, the present application provides the following technical solution:

One aspect of an embodiment of the present application provides a method for preparing a porous carbon-based metal catalyst, comprising:

(1) ultrasonically washing porous carbon having a particle size of 10-100 μm for 5 min with absolute ethyl alcohol and deionized water in turn, and then drying;

(2) activating the porous carbon treated in step (1) with vapor having a temperature of 150-180° C. for 1-5 h, and then drying;

(3) soaking the porous carbon treated in step (2) into a strong base solution having a temperature of 30-60° C. for 0.5-2 h, the strong base solution containing 5-10 wt % of hydrogen peroxide and 10-15 wt % of strong base, then taking out the porous carbon, washing with deionized water until the pH value is 7-7.5;

(4) placing the moist porous carbon treated in step (3) into an inner cavity of a graphitization device, introducing a first mixed gas consisting of nitrogen and nitric oxide in a volume ratio of 2:0.5-1.5 at the flow rate of 30-300 ml/min, simultaneously heating to 2200-2800° C. at the temperature raising rate of 10-30° C./min, carrying out heat preservation for 1-6 h, and then cooling to obtain activated nitrogen-doping graphite porous carbon;

(5) soaking the activated nitrogen-doping graphite porous carbon into stannous chloride solution having a concentration of 10-25 g/L under the condition of 25-40° C., then taking out, washing for 2-4 times with ammonium hydrogen having a concentration of 1-10 wt %, then drying, soaking into a soluble cobalt salt solution having a temperature of 60-80° C., pH of 8.5-9.5 and a concentration of 20-40 g/L to react for 3-5 h, then taking out, and drying to obtain a catalyst precursor; and (6) placing the catalyst precursor obtained in step (5) in a sealed reaction chamber and introducing a second mixed gas consisting of ammonia and hydrogen in a volume ratio of 1:0.2-1 at the flow rate of 15-60 ml/min, simultaneously heating for 320-450° C. at the temperature raising rate of 2-10° C./min, carrying out heat preservation for 30 min-4 h, and then cooling to obtain the porous carbon-based metal catalyst.

In some embodiments, the temperature of drying is 50-80° C.

In some embodiments, in step (1), the power of the ultrasonic washing is 300-400W.

In some embodiments, in step (5), the concentration of stannous chloride solution is 10-20 g/L.

In some embodiments, in step (5), the soluble cobalt salt comprises cobalt nitrate or cobalt chloride.

Another aspect of an embodiment of the present application provides a porous carbon-based metal catalyst prepared by any one method previously described.

Another aspect of an embodiment of the present application provides use of the porous carbon-based metal catalyst in production of hydrogen by catalyzing the hydrolysis of ammonia borane.

Another aspect of an embodiment of the present application provides use of the porous carbon-based metal catalyst in preparation of a hydrogen fuel battery.

Another aspect of an embodiment of the present application provides a method for producing hydrogen, comprising: dispersing the porous carbon-based metal catalyst into an ammonia borane aqueous solution at room temperature, and allowing the ratio of the metal catalyst to ammonia borane to be 0.1 mg-0.5 mg:1 mmol, so as to catalytically decompose ammonia borane to obtain hydrogen.

Another aspect of an embodiment of the present application provides a method for producing hydrogen, comprising:

dispersing the porous carbon-based metal catalyst into an ammonia borane aqueous solution under the conditions of room temperature and UV irradiation, and allowing the ratio of the metal catalyst to ammonia borane to be 0.01 mg-0.1 mg:1 mmol, so as to catalytically decompose ammonia borane to obtain hydrogen.

Another aspect of an embodiment of the present application provides a method for regenerating the porous carbon-based metal catalyst, comprising: heating the inactivated porous carbon-based metal catalyst to 300-350° C. at the atmosphere of ammonia gas, and carrying out heat preservation for 15 min-30 min.

Compared with the prior art, the porous carbon-based metal catalyst provided by the present application has excellent catalytic performance, is especially suitable for production of hydrogen through efficiently catalytic decomposition of ammonia borane, is not prone to inactivation, is easy to regenerate after inactivation, and meanwhile the preparation method is environmental-friendly, is suitable for large-scale production, and has a wide application prospect in the fields such as hydrogen fuel batteries.

DETAILED DESCRIPTION OF THE EMBODIMENTS

The present application will be further described through the following examples. The present application can be better understood through the following examples. However, it is easily understood by those skilled in the art that the specific material ratios, process conditions and their results described in examples are only for illustrating the present application but should not restrict or do not restrict the present application described in claims in detail.

Unless stated otherwise, various raw materials, reaction equipment, test apparatuses and test methods adopted in the following examples are all well-known in the art.

Example 1 A method for preparing a porous carbon-based metal catalyst, comprising the following steps:

(1) porous carbon having an average particle size of about 10 μm was ultrasonically washed with absolute ethyl alcohol and deionized water (power was about 300W) for 5 min, and then dried at about 80° C.;

(2) the porous carbon treated in step (1) was activated with vapor having a temperature of 180° C. for 5 h, and then dried at about 80° C.;

(3) the porous carbon treated in step (2) was soaked into a strong base solution having a temperature of 30° C. for 2 h, the strong base solution contained 10 wt % of hydrogen peroxide and 15 wt % of strong base, then the porous carbon was taken out and washed with deionized water until the pH value was 7;

(4) the moist porous carbon treated in step (3) was placed into an inner cavity of a graphitization device, a first mixed gas consisting of nitrogen and nitric oxide in a volume ratio of 2:0.5 was introduced at the flow rate of 300 ml/min, and meanwhile the porous carbon was heated to 2800° C. at the temperature raising rate of 30° C./min, subjected to heat preservation for 6 h and then cooled to obtain activated nitrogen-doping graphite porous carbon;

(5) the activated nitrogen-doping graphite porous carbon was soaked into a stannous chloride solution having a concentration of 25 g/L for 10 min under the condition of 40° C., then taken out, washed twice with ammonium hydrogen having a concentration of 10 wt %, dried at about 80° C. and then soaked into a solution having a temperature of 60° C., a pH of 9.5 and 40 g/L cobalt nitrate again to react for 5 h, and subsequently the reaction product was taken out and dried at 80° C. to obtain a catalyst precursor; and (6) the catalyst precursor obtained in step (5) was placed in a sealed reaction chamber and a second mixed gas consisting of ammonia and hydrogen in a volume ratio of 1:0.2 was introduced at the flow rate of 60 ml/min, and meanwhile the catalyst precursor was heated for 450° C. at the temperature raising rate of 10° C./min and subjected to heat preservation for 30 min, and then cooled to obtain the porous carbon-based metal catalyst.

Example 2 A method for preparing a porous carbon-based metal catalyst, comprising the following steps:

(1) porous carbon having an average particle size of about 20 μm was ultrasonically washed for 10 min with absolute ethyl alcohol and deionized water (power was about 400W), and then dried at about 80° C.;

(2) the porous carbon treated in step (1) was activated with vapor having a temperature of 150° C. for 3 h, and then dried at about 80° C.;

(3) the porous carbon treated in step (2) was soaked into a strong base solution having a temperature of 60° C. for 0.5 h, the strong base solution contained 5 wt % of hydrogen peroxide and 10 wt % of strong base, and then the porous carbon was taken out and washed with deionized water until the pH value was 7.5;

(4) the moist porous carbon treated in step (3) was placed into an inner cavity of a graphitization device, a first mixed gas consisting of nitrogen and nitric oxide in a volume ratio of 2:1.5 was introduced at the flow rate of 30 ml/min, and meanwhile the porous carbon was heated to 2200° C. at the temperature raising rate of 10° C./min, subjected to heat preservation for 3 h and then cooled to obtain activated nitrogen-doping graphite porous carbon;

(5) the activated nitrogen-doping graphite porous carbon was soaked into a stannous chloride solution having a concentration of 10 g/L for 5 min under the condition of 25° C., taken out, washed for 4 times with ammonium hydrogen having a concentration of 1-10 wt %, dried at about 80° C. and then soaked into a solution having a temperature of 60° C., pH of 8.5 and 20 g/L cobalt chloride again to react for 3 h, and subsequently the reaction product was taken out and dried at 80° C. to obtain a catalyst precursor; and (6) the catalyst precursor obtained in step (5) was placed in a sealed reaction chamber and a second mixed gas consisting of ammonia and hydrogen in a volume ratio of 1:1 was introduced at the flow rate of 15 ml/min, and meanwhile the above catalyst precursor was heated for 320° C. at the temperature raising rate of 2° C./min, subjected to heat preservation for 4 h and then cooled to obtain the porous carbon-based metal catalyst.

Example 3 A method for preparing a porous carbon-based metal catalyst, comprising the following steps:

(1) porous carbon having an average particle size of about 50 μm was ultrasonically washed for 8 min with absolute ethyl alcohol and deionized water (power was about 400W), and then dried at about 80° C.;

(2) the porous carbon treated in step (1) was activated with vapor having a temperature of 160° C. for 2 h, and then dried at about 80° C.;

(3) the porous carbon treated in step (2) was soaked into a strong base solution having a temperature of 50° C. for 1 h, the strong base solution contained 8 wt % of hydrogen peroxide and 12 wt % of strong base, and then the porous carbon was taken out and washed with deionized water until the pH value was 7;

(4) the moist porous carbon treated in step (3) was placed into an inner cavity of a graphitization device, a first mixed gas consisting of nitrogen and nitric oxide in a volume ratio of 2:1 was introduced at the flow rate of 100 ml/min, and meanwhile the porous carbon was heated to 2500° C. at the temperature raising rate of 20° C./min, subjected to heat preservation for 3 h and then cooled to obtain activated nitrogen-doping graphite porous carbon;

(5) the activated nitrogen-doping graphite porous carbon was soaked into a stannous chloride solution having a concentration of 15 g/L for 10 min under the condition of 40° C., then taken out, washed for 3 times using ammonium hydrogen having a concentration of 5 wt %, dried at about 80° C. and then soaked into a solution having a temperature of 60° C., a pH of 9.5 and 20 g/L cobalt nitrate again to react for 3-5 h, and then the reaction product was taken out and dried at 80° C. to obtain a catalyst precursor; and (6) the catalyst precursor obtained in step (5) was placed in a sealed reaction chamber and a second mixed gas consisting of ammonia and hydrogen in a volume ratio of 1:0.5 was introduced at the flow rate of 30 ml/min, and meanwhile the above catalyst precursor was heated for 400° C. at the temperature raising rate of 5° C./min, subjected to heat preservation for 2 h and then cooled to obtain the porous carbon-based metal catalyst.

Example 4 A method for preparing a porous carbon-based metal catalyst, comprising the following steps:

(1) porous carbon having an average particle size of about 100 μm was ultrasonically washed for 10 min with absolute ethyl alcohol and deionized water, and then dried at about 80° C.;

(2) the porous carbon treated in step (1) was activated with vapor having a temperature of 170° C. for 4 h, and then dried at about 80° C.;

(3) the porous carbon treated in step (2) was soaked into a strong base solution having a temperature of 40° C. for 1.5 h, the strong base solution contained 6.5 wt % of hydrogen peroxide and 13.5 wt % of strong base, and then the porous carbon was taken out and washed with deionized water until the pH value was 7;

(4) the moist porous carbon treated in step (3) was placed into an inner cavity of a graphitization device, a first mixed gas consisting of nitrogen and nitric oxide in a volume ratio of 2:1.2 was introduced at the flow rate of 150 ml/min, and meanwhile the porous carbon was heated to 2600° C. at the temperature raising rate of 15° C./min, subjected to heat preservation for 3 h and then cooled to obtain activated nitrogen-doping graphite porous carbon;

(5) the activated nitrogen-doping graphite porous carbon was soaked into a stannous chloride solution having a concentration of 15 g/L for 6 min under the condition of 40° C., then taken out, washed for 2-4 times with ammonium hydrogen having a concentration of 1-10 wt %, then dried at about 80° C. and soaked into a solution having a temperature of 60° C., pH of 9.5 and a 30 g/L cobalt nitrate again to react for 3 h, and then the reaction product was taken out and dried at 80° C. to obtain a catalyst precursor; and (6) the catalyst precursor obtained in step (5) was placed in a sealed reaction chamber and a second mixed gas consisting of ammonia and hydrogen in a volume ratio of 1:0.8 was introduced at the flow rate of 40 ml/min, and meanwhile the above catalyst precursor was heated for 360° C. at the temperature raising rate of 6° C./min, subjected to heat preservation for 4 h and then cooled to obtain the porous carbon-based metal catalyst.

Example 5 A method for preparing a porous carbon-based metal catalyst, comprising the following steps:

(1) porous carbon having an average particle size of about 80 μm was ultrasonically washed for 5 min with absolute ethyl alcohol and deionized water, and then dried at about 80° C.;

(2) the porous carbon treated in step (1) was activated with vapor having a temperature of 165° C. for 2.5 h, and then dried at about 80° C.;

(3) the porous carbon treated in step (2) was soaked into a strong base solution having a temperature of 40° C. for 1.5 h, the strong base solution contained 9 wt % of hydrogen peroxide and 11 wt % of strong base, and then the porous carbon was taken out and washed with deionized water until the pH value was 7;

(4) the moist porous carbon treated in step (3) was placed into an inner cavity of a graphitization device, a first mixed gas consisting of nitrogen and nitric oxide in a volume ratio of 2:1.2 was introduced at the flow rate of 180 ml/min, and meanwhile the porous carbon was heated to 2600° C. at the temperature raising rate of 25° C./min, subjected to heat preservation for 2 h and then cooled to obtain activated nitrogen-doping graphite porous carbon;

(5) the activated nitrogen-doping graphite porous carbon was soaked into a stannous chloride solution having a concentration of 15 g/L for 8 min under the condition of 40° C., then taken out, washed for 4 times using ammonium hydrogen having a concentration of 2 wt %, then dried at about 80° C. and then soaked into a solution having a temperature of 60° C., a pH of 8.5 and 25 g/L cobalt chloride again to react for 3-5 h, and then the reaction product was taken out and dried at 80° C. to obtain a catalyst precursor; and (6) the catalyst precursor obtained in step (5) was placed in a sealed reaction chamber and a second mixed gas consisting of ammonia and hydrogen in a volume ratio of 1:0.8 was introduced at the flow rate of 25 ml/min, and meanwhile the above catalyst precursor was heated for 350° C. at the temperature raising rate of 6° C./min, subjected to heat preservation for 2 h and then cooled to obtain the porous carbon-based metal catalyst.

The porous carbon-based metal catalysts obtained in examples 1-5 were tested through transmission electron microscopy. It can be seen that a plurality of metal clusters having a size of 50-100 nm are uniformly distributed in the surface and pore ducts of the porous carbon, each metal cluster being formed by aggregation of irregular cobalt nano sheets.

The porous carbon-based metal catalysts obtained in examples 1-5 were tested through XDR detection. Peaks corresponding to activated carbon, graphite and carbon nitride and a peak corresponding to metal cobalt simultaneously exist in the obtained spectrum. By calculation, the content of graphite carbon is about 25-30 wt %, the content of metal cobalt is about 18-22 wt %, and the content of nitrogen element is about 1.2-1.6 wt %.

The catalytic activities of the porous carbon-based metal catalysts obtained in examples 1-5 were detected by measuring the hydrogen producing rate in a gas burette system filled with water. The process comprises:

a certain amount of metal catalysts were evenly dispersed into deionized water at room temperature to form dispersions, then different volumes of dispersions were added into two-neck reaction bottles, subsequently, a certain amount of ammonia borane aqueous solution was added, the reactor was sealed, the reaction solution was stirred with a magnetic stirrer at a stirring speed of 300-800 rpm. At the same time, a stopwatch was pressed to record the scale of water surface in the measuring cylinder until no hydrogen was produced, and the reaction stopped.

The results show that when the ratio of the metal catalyst to the ammonia borane is 0.1 mg-0.5 mg, the effects of the metal catalysts on catalyzing the production of hydrogen from ammonia borane are all extremely good, wherein the optimal ratio is 0.5 mg:1 mmol. By calculation, the apparent activity energy of the metal catalyst is 52.02 kJ/mol at room temperature environment and in the optimal ratio.

By utilizing the previous catalytic activity test method, circular hydrolysis experiment is done in the optimal ratio of the same metal catalyst to ammonia borane being 0.5 mg:1 mmol. If the hydrolysis of ammonia borane is circularly catalyzed for less than 20 times, the hydrolysis activity is basically unchanged. If the hydrolysis of ammonia borane is circularly catalyzed for more than 50 times, the hydrolysis activity is reduced by about 20-30%.

It is very surprising that in the process of using the previous catalytic activity test method to test the metal catalyst, if ultraviolet irradiation is used for assistance, the ratio of the metal catalyst to the ammonia borane can be further reduced to 0.01 mg-0.1 mg:1 mmol, optimal ratio is about 0.08 mg:1 mmol, at this moment, the production rate of hydrogen is basically consistent to the previous optimal ratio without ultraviolet irradiation namely 0.5 mg:1 mmol.

After the previous metal catalyst is inactivated due to use many times, regeneration occurs only under the conditions that at the ammonia atmosphere, the temperature is raised to 300-500° C. and heat preservation is performed for 15 min-30 min. After regeneration, the catalytic activity can be kept at about 60-90% of the initial activity.

Finally, it is noted that the term "include", "comprise" or any other variants are intended for non-exclusive inclusion so that processes, methods, articles or equipment that include a series of elements include not only those elements, but also other elements that are not explicitly listed, or also includes elements inherent to such the processes, methods, articles or equipment.

What is claimed is:

1. A method for preparing a porous carbon-based metal catalyst, comprising:
   (1) ultrasonically washing a porous carbon having a particle size of 10-100 μm for 5-10 min with an absolute ethyl alcohol and deionized water in turn, and then drying the porous carbon;
   (2) activating the porous carbon treated in step (1) for 1-5 h with vapor having a temperature of 150-180° C., and then drying the porous carbon;
   (3) soaking the porous carbon treated in step (2) into a strong base solution having a temperature of 30-60° C. for 0.5-2 h, the strong base solution containing 5-10 wt % of hydrogen peroxide and 10-15 wt % of a strong base, then taking out the porous carbon, and washing the porous carbon with deionized water until a pH value is 7-7.5 to obtain a moist porous carbon;
   (4) placing the moist porous carbon obtained in step (3) into an inner cavity of a graphitization device, and introducing a first mixed gas consisting of nitrogen and nitric oxide in a volume ratio of 2:(0.5-1.5) at a flow rate of 30-300 ml/min, simultaneously heating to 2200-2800° C. at a temperature raising rate of 10-30° C./min, carrying out a first heat preservation for 1-6 h, and then cooling the graphitization device to obtain an activated nitrogen-doping graphite porous carbon;
   (5) soaking the activated nitrogen-doping graphite porous carbon into a stannous chloride solution having a concentration of 10-25 g/L under a condition of 25-40° C. to obtain a first soaked nitrogen-doping graphite porous carbon, then taking out and washing the first soaked nitrogen-doping graphite porous carbon for 2-4 times with an ammonium hydrogen having a concentration of 1-10 wt % to obtain a washed nitrogen-doping graphite porous carbon, then drying the washed nitrogen-doping graphite porous carbon to obtain a dried nitrogen-doping graphite porous carbon, soaking the dried nitrogen-doping graphite porous carbon into a soluble cobalt salt solution having a temperature of 60-80° C., a pH of 8.5-9.5 and a concentration of 20-40 g/L to react for 3-5 h to obtain a second soaked nitrogen-doping graphite porous carbon, then taking out and drying the second soaked nitrogen-doping graphite porous carbon to obtain a catalyst precursor; and
   (6) placing the catalyst precursor obtained in step (5) in a sealed reaction chamber and introducing a second mixed gas consisting of ammonia and hydrogen in a volume ratio of 1:(0.2-1) at a flow rate of 15-60 ml/min, simultaneously heating for 320-450° C. at temperature raising rate of 2-10° C./min, carrying out a second heat preservation for 30 min-4 h, and then cooling the sealed reaction chamber to obtain the porous carbon-based metal catalyst.

2. The method for preparing the porous carbon-based metal catalyst according to claim 1, wherein a temperature of the drying in steps (1), (2), or (5) is 50-80° C.

3. The method for preparing the porous carbon-based metal catalyst according to claim 1, wherein in step (1), a power of the ultrasonically washing is 300-400W.

4. The method for preparing the porous carbon-based metal catalyst according to claim 1, wherein in step (5), a concentration of the stannous chloride solution is 10-20 g/L.

5. The method for preparing the porous carbon-based metal catalyst according to claim 1, wherein in step (5), the soluble cobalt salt solution comprises cobalt nitrate or cobalt chloride.

6. A porous carbon-based metal catalyst prepared by the method according to claim 1.

7. A method for producing hydrogen, comprising: dispersing the porous carbon-based metal catalyst according to claim 6 into an ammonia borane aqueous solution at room temperature under UV irradiation, and allowing a ratio of the porous carbon-based metal catalyst to ammonia borane to be (0.01 mg-0.1 mg):1 mmol, so as to catalytically decompose the ammonia borane to obtain the hydrogen.

8. The porous carbon-based metal catalyst according to claim 6, wherein a temperature of the drying in steps (1), (2), or (5) is 50-80° C.

9. The porous carbon-based metal catalyst according to claim 6, wherein in step (1), a power of the ultrasonically washing is 300-400W.

10. The porous carbon-based metal catalyst according to claim 6, wherein in step (5), a concentration of the stannous chloride solution is 10-20 g/L.

11. The porous carbon-based metal catalyst according to claim 6, wherein in step (5), the soluble cobalt salt solution comprises cobalt nitrate or cobalt chloride.

12. A method for producing hydrogen, comprising: dispersing the porous carbon-based metal catalyst according to claim 6 into an ammonia borane aqueous solution at room temperature, and allowing a ratio of the porous carbon-based metal catalyst to ammonia borane to be (0.1 mg-0.5 mg):1 mmol, so as to catalytically decompose the ammonia borane to obtain the hydrogen.

\* \* \* \* \*